Nov. 8, 1932.  O. C. GOEHRING  1,887,408

COMBINED FUMELESS AND VENTILATED OVEN AND BROILER

Filed June 20, 1931  2 Sheets-Sheet 1

Otto C. Goehring, INVENTOR

BY Victor J. Evans and Co. ATTORNEY

Nov. 8, 1932.  O. C. GOEHRING  1,887,408

COMBINED FUMELESS AND VENTILATED OVEN AND BROILER

Filed June 20, 1931  2 Sheets-Sheet 2

Otto C. Goehring
INVENTOR

BY Victor J. Evans
and Co. ATTORNEY

Patented Nov. 8, 1932

1,887,408

UNITED STATES PATENT OFFICE

OTTO C. GOEHRING, OF ELMHURST, NEW YORK

COMBINED FUMELESS AND VENTILATED OVEN AND BROILER

Application filed June 20, 1931. Serial No. 545,733.

This invention relates to stoves especially adapted for cooking and similar purposes and of the type employing gas or other similar fuels as a heating medium and has for the primary object, the provision of an improved means for efficiently heating the oven and broiler thereof, so that a maximum amount of heat may be obtained from a minimum consumption of fuel.

Another object of this invention is the provision of the oven and broiler closed to fumes or exhaust from the heating medium and provided with efficient vent means whereby the cooking fumes within the broiler and oven may be carried off or exhausted therefrom.

A further object of this invention is the provision of means whereby the heat from the burner or heating medium may be directed either to the broiler or to the oven.

A further object of this invention is the provision of means for permitting the full advantages of the heat to be had to either the oven or the broiler when the burner or heating medium is adjusted to supply the heat direct to either the oven or the broiler.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a front elevation illustrating a stove constructed in accordance with my invention.

Figure 1:
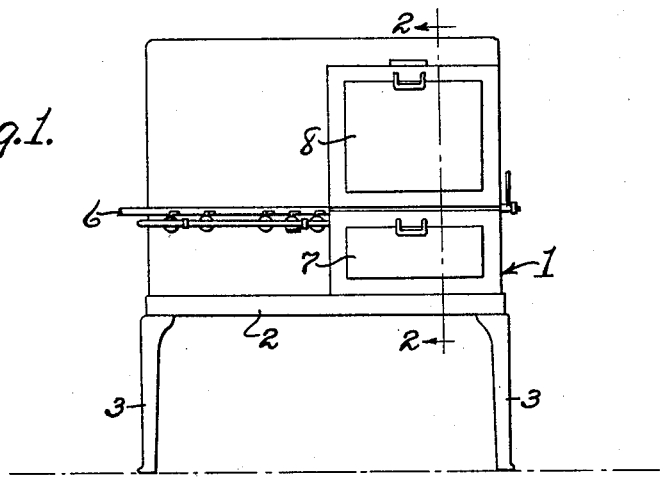

Referring in detail to the drawings, the numeral 1 indicates a stove especially adapted for cooking purposes and is adapted to use gas as a fuel and includes a base 2 supported by legs 3 and mounted in superimposed relation upon the base 2 is a broiler 4 and an oven 5. The ordinary stove top or frame 6 is located above the base 2 and laterally of the oven and broiler as clearly shown in Figure 1 and has associated therewith the usual burners.

Figures 2, 8:
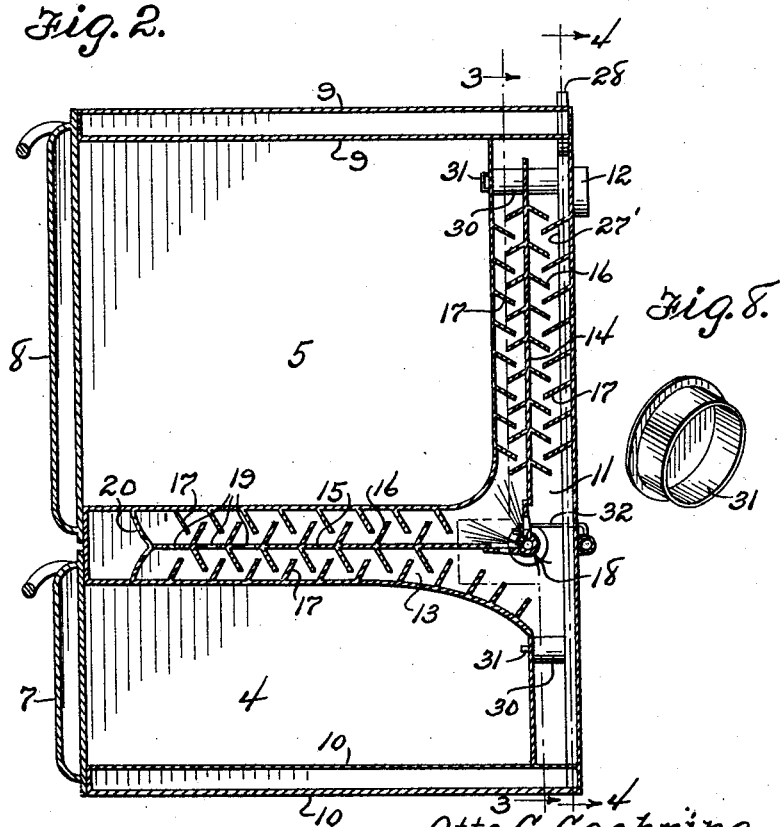
Figure 2 is a sectional view taken on the line 2—2 of Figure 1.
Figure 8 is a perspective view illustrating a closure cap.
Figure 3:
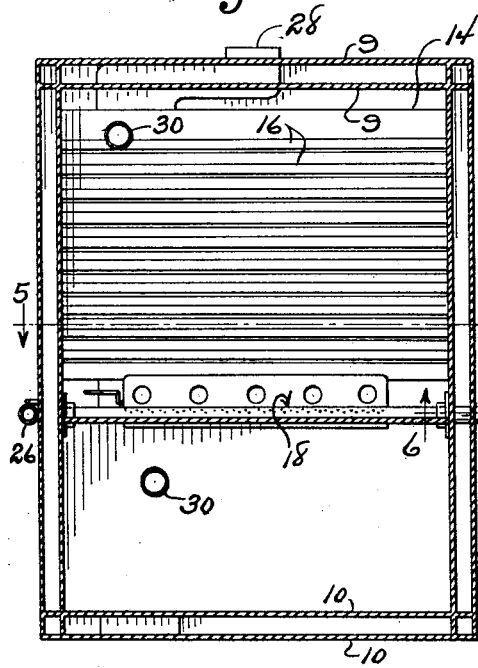
Figure 3 is a sectional view taken on the line 3—3 of Figure 2.
Figure 4:
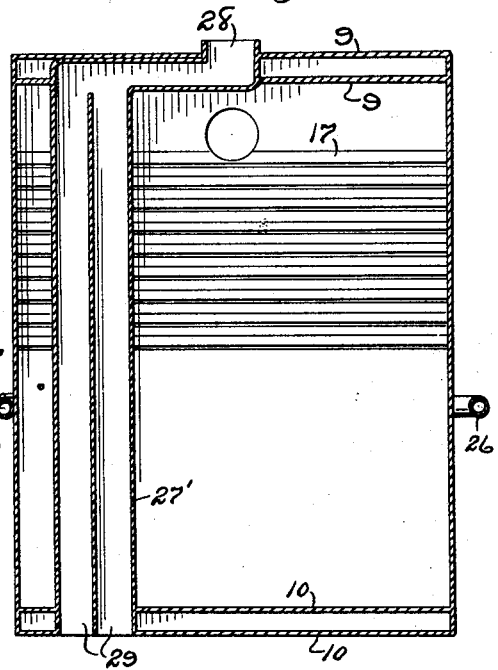
Figure 4 is a sectional view taken on the line 4—4 of Figure 2.
Figure 5:
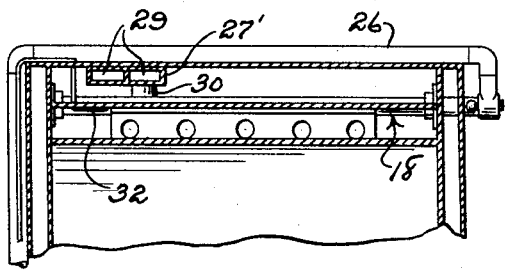
Figure 5 is a sectional view taken on the line 5—5 of Figure 3.
Figure 7:
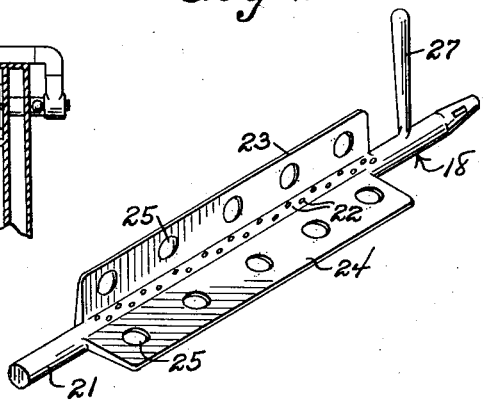
Figure 7 is a perspective view illustrating the burner.
Figure 6:
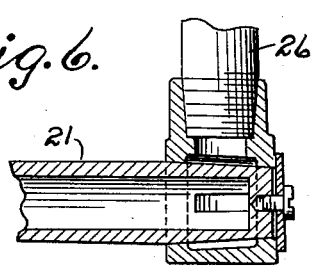
Figure 6 is a detail sectional view taken on the line 6—6 of Figure 3.

The broiler and oven 5 have their fronts closed by doors 7 and 8 respectively and preferably are constructed of inner and outer walls as clearly shown in Figure 2. The top of the oven 5 is constructed of inner and outer walls 9 while the bottom of the broiler 4 is constructed from inner and outer walls 10. A heat passage 11 is arranged vertically in rear of the oven 5 and broiler 4 with the lower end opened to the atmosphere and the upper end in communication with an outlet nipple 12 adapted to be connected in the ordinary manner with the flue of a chimney. A horizontally disposed heat passage or chamber 13 is disposed between the oven 5 and the broiler 4 and in communication with the vertical heat chamber or passage 11. Partitions 14 and 15 are arranged centrally of the heat chambers or passages 11 and 13 and have formed integral therewith baffle plates 16 cooperating with baffles 17 formed on the walls of the heat chambers or passages 11 and 13 in forming staggered passages for heat to pass therethrough from a burner 17. The baffles will cause the heat from the burner to strike against the walls of the oven 5 and broiler 4 and said oven and broiler preferably have their side walls constructed from inner and outer walls to form spaces in communication with the heat chambers or passages. The partition 15 at its forward end is provided with a series of openings 19 to permit the heated air to circulate through said partition and the forward end of the partition 15 may be joined to the bottom wall of the oven 5 and the top wall of the broiler 4 by baffles 20.

The burner 18 includes a pipe 21 provided with a series of perforations 22 to permit the gas to escape therefrom and to ignite and the pipe 18 carries right angularly disposed baffle plates or shields 23 and 24 each provided with openings 25. The burner is rotatably mounted and has its gas receiving end rotatably secured to a supply pipe 26 in such a way that the burner may rotate free of the supply pipe but still receive a supply of gas or fuel therefrom. A handle 27 is formed on the burner 18 and located exteriorly of the stove whereby the burner may be rocked for the purpose of directing heat therefrom either against the oven 5 or the broiler 4. When the burner 18 is in one of its adjusted positions or disposed to direct heat against the oven 5, the shields 23 are in engagement with the partitions as shown in Figure 2 and when moved into its other position for directing the heat against the broiler, the shield 23 is in engagement with the partition 15 and the shield 24 disposed downwardly within the passage 11.

Vertical flues 27' are mounted in the heat chamber or passage 11 and have a single outlet 28 and a pair of inlets 29 and the oven and broiler are in communication with said flues by tubes 30 to permit the cooking fumes within the oven and broiler to escape therefrom.

Should it be desired to convert the oven into a fireless cooker, a cap 31 is provided for closing the tube leading from the oven to its respective flue 29, thus it will be seen that heat may be retained within the oven for a considerable length of time after the burner has been extinguished. To facilitate the igniting of the burner 10 located at the rear of the stove, a suitable pilot burner 32 is provided.

While I have shown and described the preferred embodiment of my invention, it will be understood that minor changes in construction, combination and arrangement of parts may be made without departing from the spirit and scope of my invention, as claimed.

Having thus described my invention, what I claim is:

A stove comprising a supporting structure, an oven on said structure, a broiler on said structure and located below the oven, vertical and horizontal communicative chambers for the oven and broiler with the horizontal chamber located between the oven and the broiler, vertical and horizontal partitions supported in the chambers with their adjacent ends relatively spaced and arranged at right angles to each other, baffles on the partitions and walls of the chambers, a burner mounted in the intersection of the chambers for oscillatory movement, and shields on said burner and arranged at right angles to each other to engage the adjacent ends of the partitions during one position of the burner for directing heat from the burner about the oven and one of said shields adapted to engage the horizontal partition during another position of the burner for directing the heat about the broiler.

In testimony whereof I affix my signature.

OTTO C. GOEHRING.